(12) United States Patent
Bowers et al.

(10) Patent No.: US 10,235,043 B2
(45) Date of Patent: Mar. 19, 2019

(54) KEYBOARD FOR USE WITH A COMPUTING DEVICE

(71) Applicant: GOOGLE INC., Mountain View, CA (US)

(72) Inventors: Andrew Bowers, San Francisco, CA (US); Kevin Tom, San Francisco, CA (US); Rachael Elizabeth Roberts, San Francisco, CA (US); James Tanner, Los Gatos, CA (US); Caitlin Johnson, Mountain View, CA (US); Tom Buckley, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 162 days.

(21) Appl. No.: 14/842,546

(22) Filed: Sep. 1, 2015

(65) Prior Publication Data

US 2016/0062528 A1    Mar. 3, 2016

Related U.S. Application Data

(60) Provisional application No. 62/044,783, filed on Sep. 2, 2014.

(51) Int. Cl.
*G06F 3/041* (2006.01)
*G06F 1/16* (2006.01)
(Continued)

(52) U.S. Cl.
CPC ........ *G06F 3/04886* (2013.01); *G06F 1/1626* (2013.01); *G06F 1/1669* (2013.01);
(Continued)

(58) Field of Classification Search
CPC .. G06F 3/04886; G06F 3/04842; G06F 3/041; G06F 3/0221; G06F 3/0219;
(Continued)

(56) References Cited

U.S. PATENT DOCUMENTS

| 5,995,024 A | 11/1999 | Kambayashi et al. |
| D667,406 S | 9/2012 | Jitkoff |

(Continued)

FOREIGN PATENT DOCUMENTS

| CN | 103576880 A | 2/2014 |
| CN | 103823550 A | 5/2014 |

(Continued)

OTHER PUBLICATIONS

International Search Report and Written Opinion received for PCT Patent Application No. PCT/US2015/048053, dated Jan. 4, 2016, 16 pages.

(Continued)

*Primary Examiner* — Dismery Mercedes
(74) *Attorney, Agent, or Firm* — Brake Hughes Bellermann LLP

(57) ABSTRACT

A keyboard for use with a computing device includes multiple rows of keys with each of the rows of keys including multiple keys. A horizontal pitch of the keys is between 18 mm and 19 mm and a length of the rows of the keys is between 230 mm and 235 mm.

19 Claims, 7 Drawing Sheets

(51) Int. Cl.
  *G06F 3/0488* (2013.01)
  *G06F 3/023* (2006.01)
  *H01H 13/7065* (2006.01)
  *G06F 3/0489* (2013.01)
  *G06F 3/02* (2006.01)
  *H04N 21/422* (2011.01)

(52) U.S. Cl.
  CPC .............. *G06F 3/02* (2013.01); *G06F 3/0231* (2013.01); *G06F 3/0233* (2013.01); *G06F 3/0238* (2013.01); *G06F 3/0489* (2013.01); *H01H 13/7065* (2013.01); *G06F 1/1673* (2013.01); *G06F 1/1692* (2013.01); *H01H 2205/002* (2013.01); *H04N 21/42218* (2013.01); *H04N 21/42228* (2013.01)

(58) Field of Classification Search
  CPC .. G06F 3/04847; G06F 3/0233; G06F 3/0236; G06F 3/0488; G06F 3/0416; G06F 3/02; G06F 3/01; G06F 3/0489; G06F 1/16; G06F 1/1671; G06F 1/1643; G06F 1/1616; G06F 1/1662; H01H 13/70; H04M 1/72552; H04M 2250/22; H04N 21/42224; H04N 21/42228; H04N 1/00384; H04N 1/00389
  See application file for complete search history.

(56) References Cited

U.S. PATENT DOCUMENTS

| | | | |
|---|---|---|---|
| D667,407 S | 9/2012 | Jitkoff | |
| D678,883 S | 3/2013 | Lim et al. | |
| D682,274 S | 5/2013 | Gengler | |
| D690,302 S | 9/2013 | Park | |
| D697,913 S | 1/2014 | Park | |
| 8,858,102 B2* | 10/2014 | Jiang | G06F 3/0213 400/472 |
| 2002/0181192 A1 | 12/2002 | Huang et al. | |
| 2004/0067086 A1* | 4/2004 | Olodort | G06F 1/1632 400/472 |
| 2005/0002158 A1* | 1/2005 | Olodort | G06F 1/1616 361/679.15 |
| 2005/0088405 A1* | 4/2005 | Chu | G06F 1/162 345/156 |
| 2006/0020900 A1 | 1/2006 | Kumagai et al. | |
| 2008/0244447 A1 | 10/2008 | Sagar | |
| 2010/0156803 A1* | 6/2010 | Wu | G06F 3/0202 345/172 |
| 2010/0182169 A1* | 7/2010 | Walline | H03M 11/14 341/22 |
| 2010/0265183 A1* | 10/2010 | Mail | G06F 3/0238 345/168 |
| 2011/0221678 A1* | 9/2011 | Davydov | G06F 3/0486 345/168 |
| 2011/0280641 A1* | 11/2011 | Jiang | G06F 3/0213 400/486 |
| 2011/0320405 A1* | 12/2011 | Hsu | G06F 1/1632 707/634 |
| 2012/0146911 A1* | 6/2012 | Griffin | G06F 1/1662 345/168 |
| 2013/0044060 A1* | 2/2013 | Lee | G06F 3/0221 345/168 |
| 2013/0082935 A1* | 4/2013 | Duggan | G06F 3/04886 345/172 |
| 2013/0114192 A1* | 5/2013 | Wang | G11B 33/123 361/679.01 |
| 2013/0114198 A1* | 5/2013 | Gengler | B65D 25/00 361/679.08 |
| 2013/0271373 A1* | 10/2013 | Milhe | G06F 1/1671 345/168 |
| 2014/0022174 A1 | 1/2014 | Chen | |
| 2014/0139430 A1 | 5/2014 | Leung | |
| 2014/0152578 A1* | 6/2014 | Kuroda | G06F 3/0221 345/172 |
| 2015/0084871 A1* | 3/2015 | Yarvis | G06F 3/0238 345/172 |

FOREIGN PATENT DOCUMENTS

| | | | |
|---|---|---|---|
| EP | 2653947 A2 | 10/2013 | |
| JP | 11-219227 A | 8/1999 | |
| JP | 2000-20473 A | 1/2000 | |

OTHER PUBLICATIONS

Partial supplementary European Search Report for European Application No. 15837306.8, dated Mar. 21, 2018, 11 pages.
Extended European Search Report for European Application No. 15837306.8, dated Aug. 7, 2018, 11 pages.
First Office Action with English translation for Chinese Application No. 201580034705.8, dated Dec. 17, 2018, 27 pages.

* cited by examiner

KEYBOARD FOR USE WITH A COMPUTING DEVICE

CROSS REFERENCE TO RELATED APPLICATIONS

This application claims the benefit of U.S. Provisional Application No. 62/044,783, entitled "Keyboard For Use With A Computing Device," filed on Sep. 2, 2014, which is hereby incorporated by reference in its entirety.

TECHNICAL FIELD

This description relates to a keyboard for use with a computing device. The description further relates to a computing device, a computer implemented method, and a computer program.

BACKGROUND

Keyboards for smaller computing devices such as tablets and netbooks may include keys that are placed close together, which may degrade a user's experience using the keyboard to interact with the computing device.

SUMMARY

According to one general aspect, a keyboard for use with a computing device includes multiple rows of keys with each of the rows of keys including multiple keys. A horizontal pitch of the keys is between 18 mm and 19 mm and a length of the rows of the keys is between 230 mm and 235 mm.

In another general aspect, a computing device includes a memory that is configured to store instructions and a processor that is operably connected to the memory and that is configured to execute the instructions stored in the memory. The computing device includes a touch screen display that is operably coupled to the processor and a keyboard. The keyboard includes multiple rows of keys with each of the rows of keys including multiple keys. One of the keys is a launch key that, when selected, causes a processor of the computing device to display one or more virtual keys for selection on the touch screen display, where the virtual keys include keys not included on the keyboard.

In another general aspect, a computer-implemented method includes executing instructions stored on a non-transitory computer storage device that, when executed, cause a computing device to perform the actions of receiving a selection of a launch key on a keyboard and displaying one or more virtual keys on a display of the computing device in response to receiving the selection of the launch key, where the virtual keys represent keys not included on the keyboard.

In another general aspect, a computer program includes machine readable instructions that, when executed on a computing device, cause a computing device to perform the actions of receiving a selection of a launch key on a keyboard and displaying one or more virtual keys on a display of the computing device in response to receiving the selection of the launch key, where the virtual keys represent keys not included on the keyboard.

According to aspects as described herein, there are provided devices, like keyboards or computing devices, and computer implemented methods and computer programs which enable to provide a full pitch keyboard on a smaller-sized computing device. According to an aspect, there is provided a keyboard having keys that are used frequently by users when typing and omitting keys that are not used frequently by users. According to an aspect, there is provided a computing device comprising a display and being coupled to the keyboard. The computing device is adapted to initiate displaying the omitted keys as virtual keys or soft keys on the display by user interaction or based on application context or in response to another input or control command. The provided keyboards and computing devices allow to have keyboards for small computing devices which have a full pitch keyboard.

The details of one or more implementations are set forth in the accompanying drawings and the description below. Other features will be apparent from the description and drawings, and from the claims.

DETAILED DESCRIPTION

Figure 1:
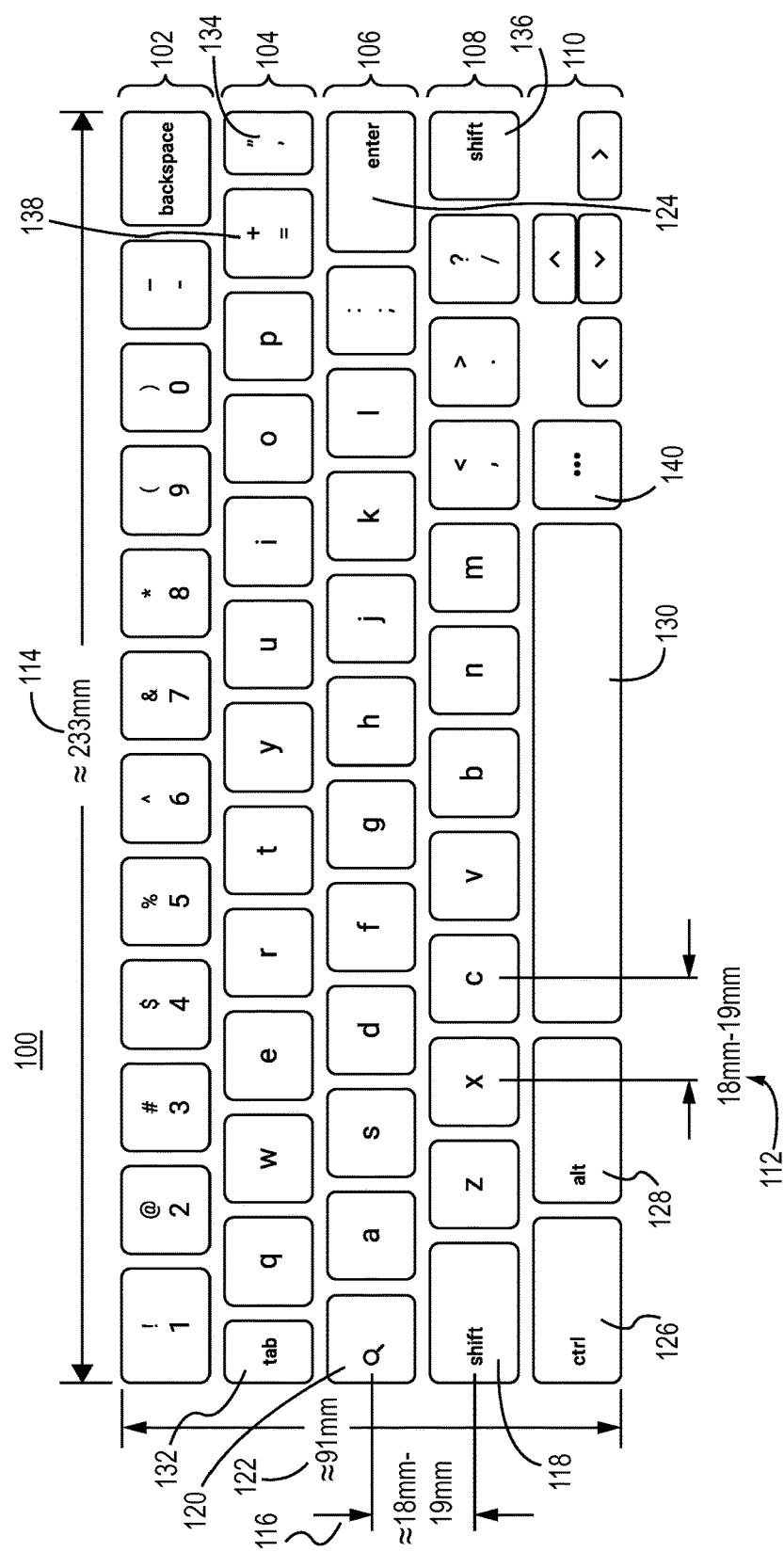
FIG. 1 is an example schematic of a keyboard.

FIG. 1 illustrates an example schematic of a keyboard 100. The keyboard 100 includes five rows of keys 102, 104, 106, 108 and 110. Each of the rows 102-110 includes multiple keys. The keyboard 100 includes keys that are used frequently by users when typing and omits some of the keys that may be found on other keyboards. In this manner, the keyboard 100 may be a full pitch keyboard and, at the same time, have a length that makes the keyboard 100 compatible for use with a smaller size computing devices such as, for example, about a 10 inch tablet computing device or about a 10 inch laptop computing device. The keyboard 100 may be used with other size computing devices as well. The keys that are omitted from the keyboard 100 may be instantiated as virtual keys or soft keys on a computing device, where the virtual keys may be launched by selecting one of the keys on the keyboard 100, as discussed in more detail below.

A pitch in the x-direction, also referred to as the horizontal pitch, may be set so that typing is comfortable for the user. The horizontal pitch may be defined as the distance between the middle of one key to the middle of an adjacent key in the same row. Typically, the pitch is measured between two adjacent keys that are a same size. For example, the pitch or horizontal pitch 112 may be measured between the "x" key and the "c" key in row 110. The same or substantially the same horizontal pitch may be consistent between adjacent keys that are the same size in the same row. A full pitch keyboard may be a keyboard that has a horizontal pitch between 18 mm and 19 mm.

In one example implementation, the horizontal pitch 112 may be between 18 mm and 19 mm. This horizontal pitch may be consistent across the keyboard 100 as measured between like-sized adjacent keys in each of the rows 102-110. Thus, the keyboard 100 may be considered a full pitch keyboard. In a more specific example implementation, the horizontal pitch 112 may be about 18.8 mm. In other example implementations, the horizontal pitch 112 may be between about 18 mm and 19 mm.

Each of the rows of keys 102-110 is the same length or at least substantially the same length such that the outside edge of the first key and the outside edge of the last key in each row are aligned. The length 114 also may be referred to as a width of the rows 102-110. The length 114 of the rows 102-110 may be between 230 mm and 235 mm. In a more specific example, the length 114 may be about 233 mm. Thus, in one specific example, the horizontal pitch 112 may be about 18.8 mm and the length 114 may be about 233 mm.

The vertical pitch 116 may be the distance between the middle of a key on one row to the middle of a key in an adjacent row. For example, the vertical pitch 116 is measured between the middle of the "shift" key 118 in row 108 and the middle of the "search" key 120 in row 106. The vertical pitch may be consistent between each of the adjacent rows (102-104, 104-106, 106-108 and 108-110). In this example, the vertical pitch 116 may be between 18 mm and 19 mm. Full vertical pitch may be considered between 18 mm and 19 mm. Thus, the keyboard 100 provides both full horizontal pitch and full vertical pitch.

The height 122 of the keyboard may be measured from a bottom edge of the bottom row 110 and a top edge of the top row 102. In this example, the height 122 may be between 89 mm and 93 mm. In a more specific example, the height 122 may be about 91 mm.

The individual keys in the rows 102-110 may include different sizes and different shapes. A number of the individual keys also may be a substantially same size and substantially the same shape. For example, the keys that include the alphabet characters in rows 104, 106 and 108 all are substantially the same size and substantially the same shape. The alphabet character keys may be a substantially square shape having a same width and a same height. In one example implementation, the alphabet character keys may have a width and a height of about 16 mm.

The numbered keys "2", "3", "4", "5", "6", "7", "8", "9" and "0" in row 102 also may be substantially the same size and substantially the same shape. In the keyboard 100, these numbered keys in row 102 (other than "1") may be a substantially square shape like the alphabet keys. In one example, implementation, these numbered keys (other than "1") may have a width and a height of about 16 mm.

In this example, the "backspace" key and the "1" key in row 102 have a non-square shape and are wider than the substantially square keys. The "backspace" key and the "1" key are substantially rectangular in shape. In other example implementations, the "backspace" key may be made wider and the "1" key may be made substantially square shaped.

Other keys on the keyboard 100 also may have a substantially rectangular shape including the "shift" key 118, the "enter" key 124, the "ctrl" key 126, the "alt" key 128 and the spacebar key 130. It is understood that the width of one or more of the rectangular shaped keys may be changed and still keep the same overall length 114 of a row the same. For example, the width of the "ctrl" key 126 and/or the "alt" key 128 may be made smaller and the width of the spacebar key 130 may be made larger and the overall width of the row 110 may remain the same.

Other keys on the keyboard 100 may have a smaller width than one of the square shaped keys. For example, the "tab" key 132 and the quotes key 134 may have a smaller width than one of the square shaped keys.

The keys in each of the rows 102-110 may be arranged and sized such that at least some of the keys are staggered or offset from row to row. For example, the "f" key in row 106 is offset from the "v" key in row 108 and offset from the "r" key in row 104. That is, those keys do not align in straight columns, but are instead offset with respect to each other.

To achieve the horizontal full pitch of the keys in the given length of the keyboard 100, several keys, which may be found on other keyboards, have been omitted. For example, the keyboard 100 includes only a single "ctrl" key 126 and a single "alt" key 128 to the left of the spacebar key 130 instead of a "ctrl" key and an "alt" key on both sides of the spacebar key 130. Also, while two "shift" keys 118 and 136 remain on the keyboard in the same row 108, the "shift" key 118 is wider than the "shift" key 136.

Further, other keys have been omitted from the keyboard 100, but may be accessed as virtual keys. For example, the "[/{" key and the "]/}" key have been removed from the keyboard 100 and implemented as a virtual key(s). In other keyboards, the "[/{" key and the "]/}" key may be found, for example, in row 104. Throughout this document, the convention "character/character", such as "[/{" is used to show two characters that appear on the same key, with one character being accessed when the key is selected and the other character being accessed when the key is selected in conjunction with using one of the "shift" keys.

Also, for example, the "~/\`" key has been omitted and implemented as a virtual key(s). The "~/\`" key may be found on other keyboards in row 102. Similarly, the "\/|" key has been omitted and implemented as a virtual key(s). The "\/|" key may be found on other keyboards in row 104.

Additionally, one or more keys have been moved on the keyboard 100 for where the keys may appear on other keyboards. For example, the "+/=" key 138 is in row 104, but on other keyboards the "+/=" key may be placed in the same row 102 as the number keys. Also, the quote key 104 is in row 104, but on other keyboards the quote key may be placed in the same row 106 as the "enter" key.

To implement the omitted keys as virtual keys, the keyboard 100 includes a launch key 140. The launch key 140 is placed next to the spacebar key 130 in the bottom row 110. When the launch key 140 is selected, the virtual keys may appear on a display of a computing device, as described below with respect to FIG. 2 and FIG. 3.

Figure 2:
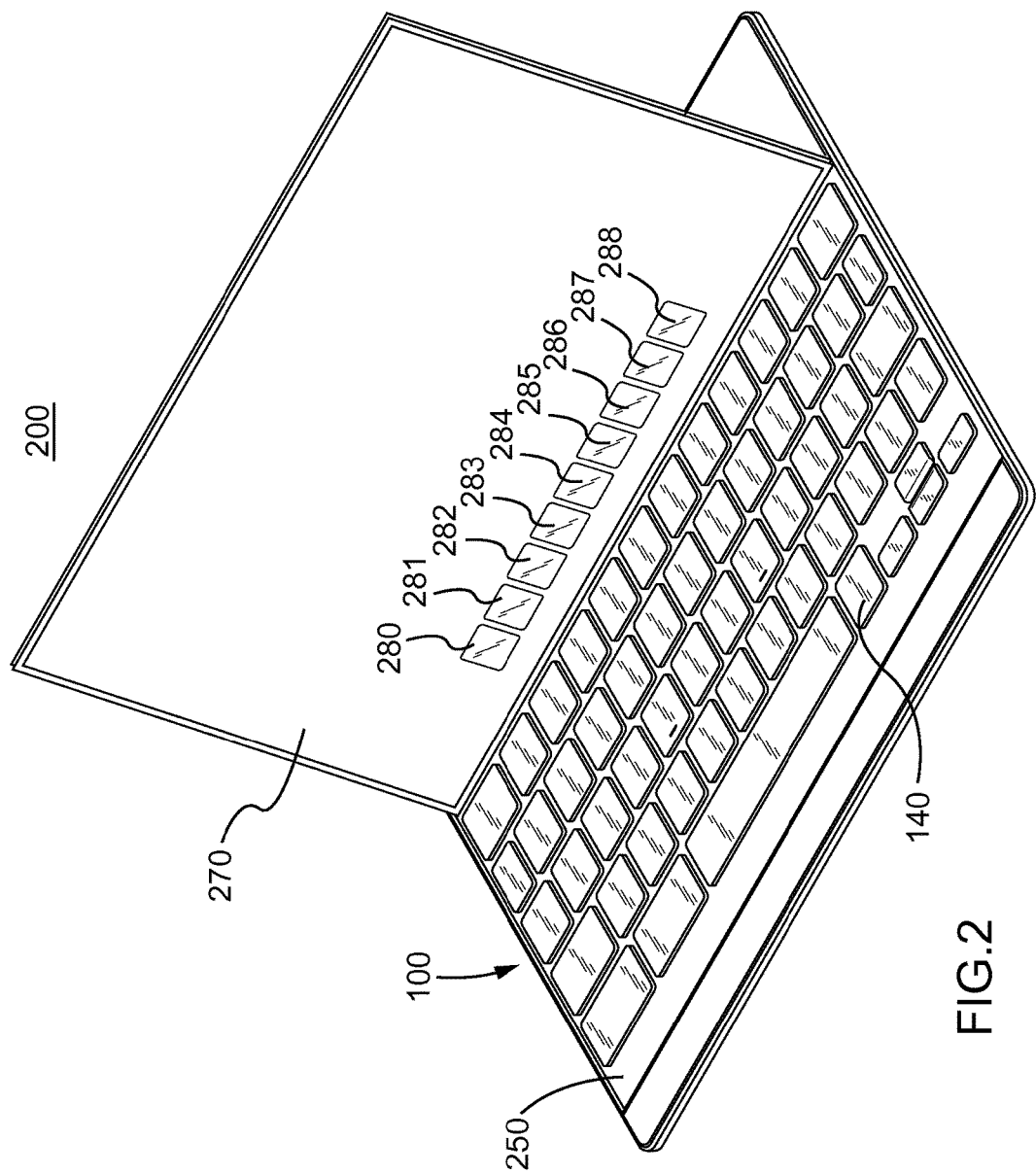
FIG. 2 is an example schematic of the keyboard of FIG. 1 and a computing device having virtual keys.

Referring to FIG. 2, a computing device 200 includes the keyboard 100 of FIG. 1. In one example implementation, the computing device 200 may include a laptop type computing device including the keyboard 100 in a base 250 of the laptop and a display 270. The display 270 may include a touch screen display such that objects on the touch screen may be selected to cause the computing device 200 to perform various different actions.

In another example implementation, the computing device 200 may be a tablet computer, where the keyboard 100 in the base 250 is separate and removable from the tablet computer portion 270, which also functions as the touch screen display for the tablet computer. The keyboard 100 in the base 250 may communicate with the tablet computer portion 270 in a wired and/or wireless manner.

In the various different computing device implementations, the same keyboard 100 may be used. The keyboard 100 includes the launch key 140. When the launch key 140 is selected, one or more virtual keys 280-288 are instantiated and displayed on the display 270. In one implementation, the virtual keys 280-288 represent the keys that have been omitted from the keyboard 100, as discussed above. After a first selection of the launch key 140 that cause the virtual keys 280-288 to appear on the display 270, a second selection of the launch key 140 may cause the virtual keys 280-288 to collapse or close such that the virtual keys 280-288 are no longer displayed on the display 270.

In one example implementation, the display 270 is a touch screen display or a table computing device with a touch screen display, which enables selection of objects and icons that are on the display 270. For example, a selection of one of the virtual keys 280-288 causes the computing device 200 to perform the function indicated by the selected key. In the situation where the virtual keys 280-288 represent one or more of the omitted keys from the keyboard 100, a selection of one of the virtual keys 280-288 causes the computing device 200 to insert the character from the selected virtual key.

The launch key 140 may be selected when using any application to launch the virtual keys 280-288. For example, the launch key 140 may be selected when using a word processing application, a browser application, an email application, a spread sheet application or any other type of application.

Figure 3:
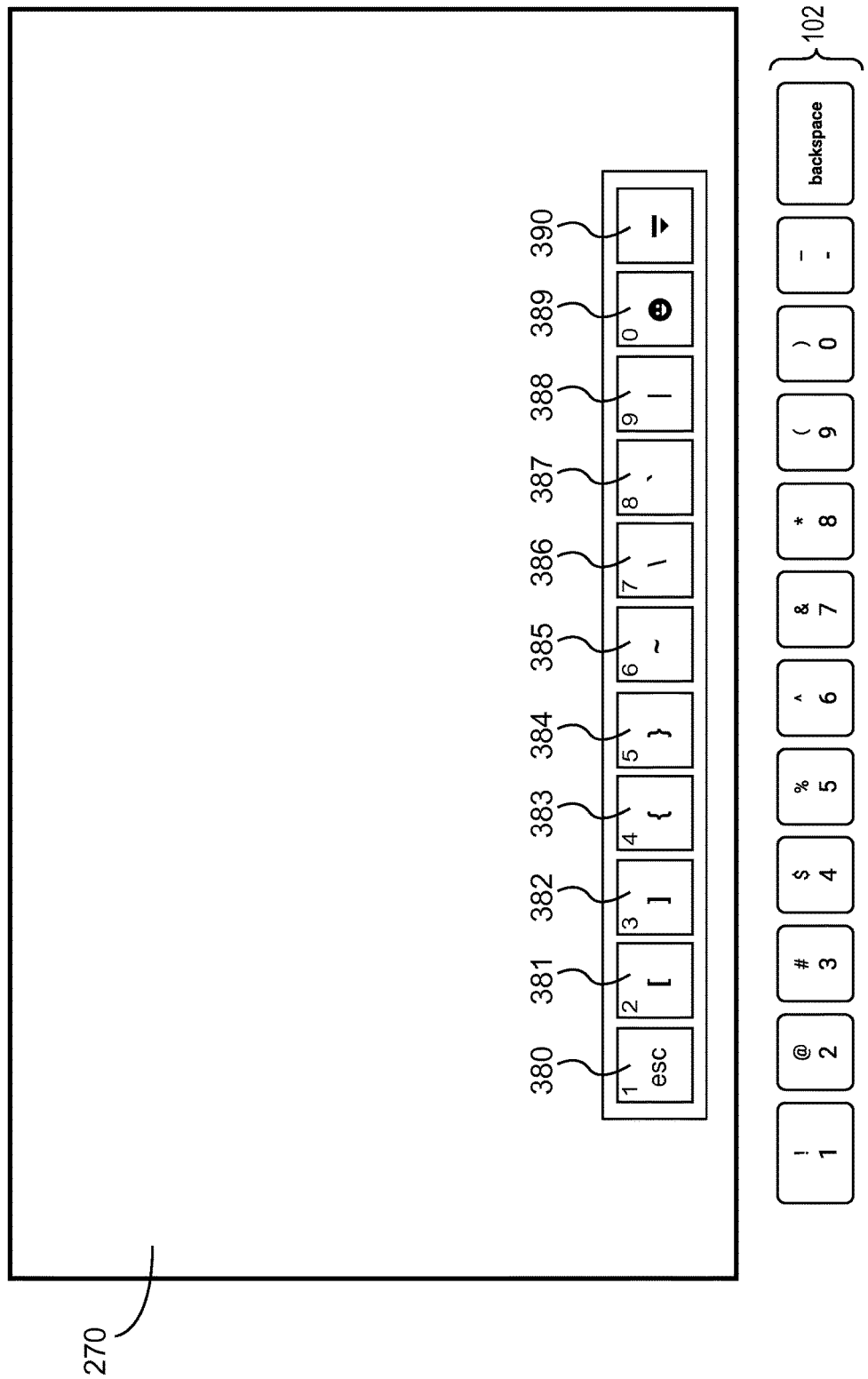
FIG. 3 is an example schematic of a portion of the keyboard of FIG. 1 and a computing device having virtual keys.

Referring to FIG. 3, an example schematic illustrates a more detailed view of virtual keys 380-390 instantiated on the display 270 along with a portion of the keyboard 100, which is showing the top row of keys 102. As discussed above, in one example implementation, the virtual keys 380-390 may represent the keys omitted from the keyboard 100. The virtual keys 380-390 may be displayed using the launch key 140 and removed from display also using the launch key 140.

The virtual keys include an escape key "esc" key 380, an "[" key 381, a "]" key 382, a "{" key 383, a "}" key 384, a "~" key 385, a "\" key 386, a """ key 387, and a "|" key 388. The keys 380-388 may represent keys that are not included on the keyboard 100 and that have been removed as physical keys from the keyboard 100. In this manner, the keyboard 100 may be a substantially full pitch keyboard with a smaller overall length so as to be more compatible with smaller-sized computing devices and yet still have a full pitch keyboard. The removed keys are implemented as virtual keys 380-388 that may be inserted by selecting the key on the display 270.

The keys 380-389 also include a number on each of the keys. The number on the virtual keys 380-389 corresponds to one of the physical number keys in row 102 of the keyboard 100. In one implementation, the character on the virtual keys 380-389 may be selected by selecting the corresponding number key in row 102 instead of touching the key on the display 270. The selection of the corresponding number key in row 102 may be implemented in computing devices having a touch screen display and in computing devices that do not have a touch screen display.

When the virtual keys 380-389 are displayed, the selection of the corresponding number key in row 102 inserts the character from the virtual key instead of the number key on the physical key in row 102. For example, when virtual key "[" 381 is displayed on the display 270 and the "2" key in row 102 is selected, then the "[" character is inserted on the display and not the "2" character. At other times, when the virtual key "[" 381 is not displayed, then selection of the "2" key in row 102 inserts the "2" character on the display 270.

In other examples, the virtual keys 380-390 may be selected by other means. For example, the virtual keys 380-390 may be selected using a shortcut of one or more keys or combination of keys from the keyboard 100.

The virtual keys 380-390 may be displayed in various locations on the display 270. In one example implementation, the virtual keys 380-390 may be displayed on the display 270 and positioned on the display 270 in alignment directly above the number keys in row 102 of the physical keyboard 100. In this manner, the selection of a virtual key using a corresponding physical number key is made easier for the user because of the physical key used to select the virtual key is lined up substantially below the virtual key displayed on the display 270. For example, the "4" key in row 102 is substantially aligned directly below the corresponding virtual key "{" 383.

In other implementations, the virtual keys 380-390 may be fixed in a position on the display 270. For instance, the virtual keys 380-390 may be fixed above the corresponding physical number keys in row 102, as discussed above. In this example, the virtual keys 380-390 may appear to be embedded as part of a window or frame being displayed on the display 270.

At other times, the virtual keys 380-390 may not be fixed in a specific location on the display 270 but may be float in various locations. For instance, the virtual keys 380-390 may be displayed at a top of the display 270 or on a side of the display 270 or as a separate window or frame that is not embedded as part of an underlying window or frame. The virtual keys 380-390 may be displayed so as not to interfere with other information currently being shown on the display 270.

Further, the virtual keys 380-390 may be shown at a location of a cursor within an application. For example, in a word processing application, the virtual keys 380-390 may appear at a position of the cursor on the display 270. Other locations or positions of the virtual keys 380-390 are also possible.

While shown in FIG. 3 as a strip of keys in a horizontal directions, the virtual keys 380-390 also may be displayed in other formats including a box or table of keys. The virtual keys 380-390 may be displayed as a vertical strip of keys in a designated location.

As discussed above, the launch key 140 on the keyboard 100 may be used to initiate the display of the virtual keys 380-390. Other means of initiating the display of the virtual keys 380-390 are also possible. For example, the virtual keys 380-390 may be displayed in response to a pointer hovering in a certain location on the display 270 (e.g., at a bottom of the display). The virtual keys 380-390 may be displayed by touching a particular location on the touch screen including, for instance, an icon or other element on the display 270. The selection of the location on the touch screen may display and activate the virtual keys 380-390. A second selection of the location on the touch screen may hid and/or de-activate the virtual keys 380-390.

In addition to the key omitted from the keyboard 380-388, the virtual keys also may include other keys. For example, virtual key 389 is an emoticon key that, when selected, may insert an emoticon or an emoji. In another example, the selection of the virtual key 389 may instantiate a menu of display of other emoticons for selection using the touch screen or the keyboard. The selection of the virtual key 389 also may cause a display of other virtual keys depicting the emoticons in the place of the other virtual keys 380-388.

In one example, the strip of virtual keys 380-390 may be swipable meaning that there may be multiple strips of virtual keys that are displayed one strip at a time. The other strips of virtual keys are accessed by swiping a finger or other object across the displayed strip to display the other strips. For instance, if the virtual key 389 is selected, then a strip of virtual emoticon keys may be displayed in the place of the virtual keys, where the strip of virtual emoticon keys may include many keys that are viewed by swiping along the strip to reveal other hidden emoticon keys.

In other example implementations, the virtual key 389 may be a different key that causes other types of virtual keys to be displayed for selection.

In one implementation, the virtual key 390 may be used to collapse or close the virtual keys from being displayed on the display 270. In other implementations, the virtual key 390 may be used to bring up a display of other virtual keys or menus of virtual keys for display and selection.

In one example implementation, the specific virtual keys that may be displayed may be application context dependent. For example, in a word processing application, a selection of the launch key 140 may cause a display of virtual keys that include functions or actions or keys related to the word processing application. For instance, in a spread sheet application, a selection of the launch key 140 may cause a display of virtual keys that include functions or actions or keys related to the spread sheet application. The selection of a virtual key 390 in these application context examples may cause a menu or other application context virtual keys to be displayed for selection. In other implementations, the virtual keys may be displayed without a specific selection of the launch key 140 and, instead, may be displayed based on a particular application being launched and/or brought into focus on the display. For instance, if the spread sheet application is launched and/or brought into focus on the display, then corresponding virtual keys may be displayed automatically in response to launching and/or bringing the spread sheet into focus, where the virtual keys may include functions or actions or keys related to the spread sheet application. When the virtual keys are being displayed, a selection of the launch key 140 may cause the virtual keys to disappear. In an implementation where the virtual keys are displayed based on the application context and in response to the application launch and/or focus, the launch key 140 may still function as described above.

Figure 4:
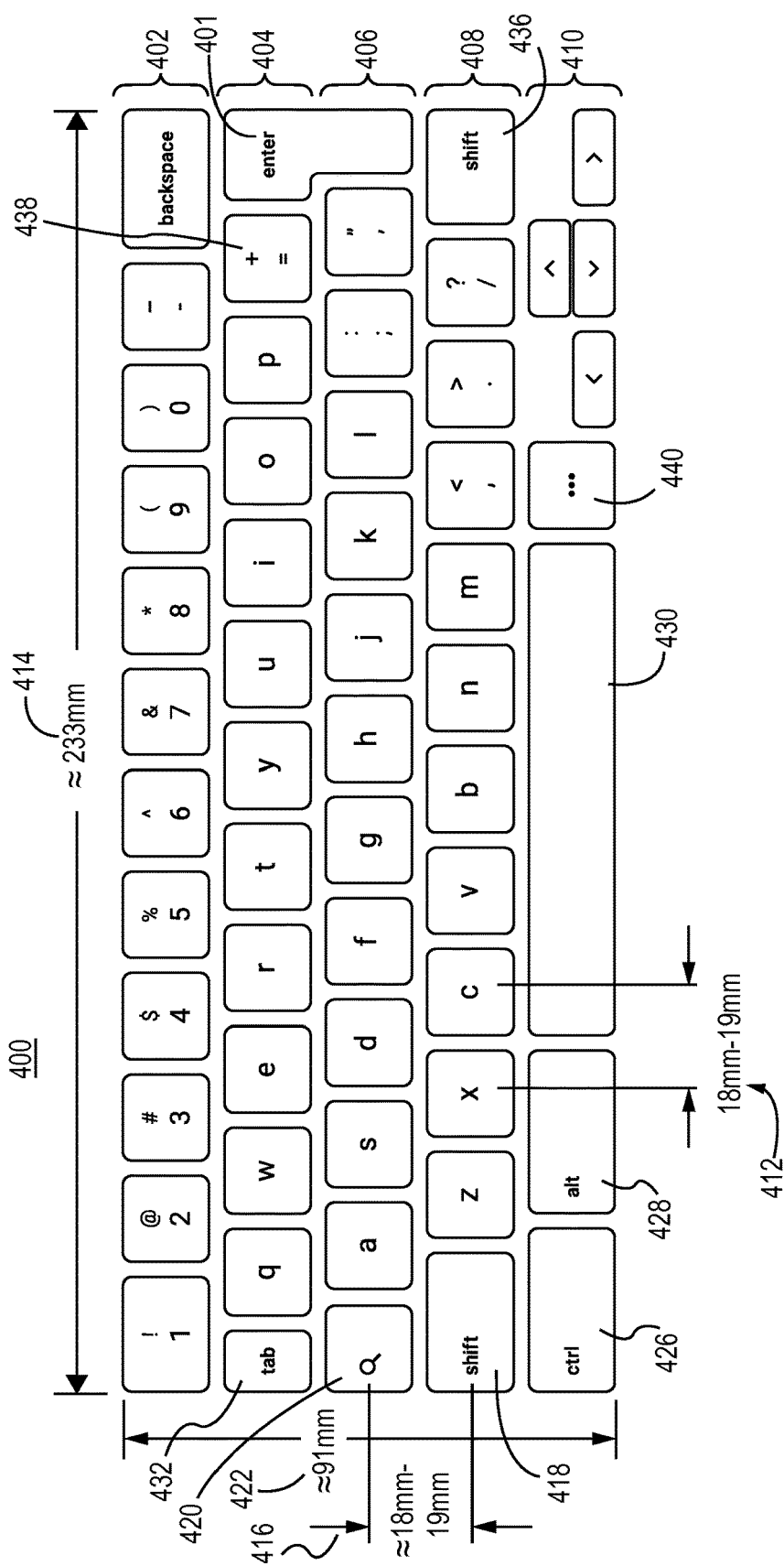
FIG. 4 is an example schematic of a keyboard.

Referring to FIG. 4, an example schematic of a keyboard 400 is illustrated. The keyboard 400 is substantially similar in pitch and size to the keyboard 100 of FIG. 1. In FIG. 4, the keyboard 400 has a slightly different key layout to accommodate a different shaped "enter" key 401. The "enter" key 401 spans across two rows of the keyboard 400.

The keyboard 400 includes five rows of keys 402, 404, 406, 408 and 410. Each of the rows 402-410 includes multiple keys. The keyboard 400 includes keys that are used frequently by users when typing and omits some of the keys that may be found on other keyboards. In this manner, the keyboard 400 may be a full pitch keyboard and, at the same time, have a length that makes the keyboard 400 compatible for use with a smaller size computing devices such as, for example, about a 10 inch tablet computing device or about a 10 inch laptop computing device. The keyboard 400 may be used with other size computing devices as well. The keys that are omitted from the keyboard 400 may be instantiated as virtual keys or soft keys on a computing device, where the virtual keys may be launched by selecting one of the keys on the keyboard 400, as discussed in above with respect to keyboard 100 of FIG. 1 and as illustrated in FIGS. 2 and 3 and discussed in the corresponding text. Even though the keyboard 400 includes a slightly different key layout, the keyboard 400 may function in the same manner as discussed with respect to the keyboard 100 of FIG. 1 and the operation of the virtual keys as discussed above.

In keyboard 400, the pitch or horizontal pitch 412 may be measured between the "x" key and the "c" key in row 410. The horizontal pitch 412 may be between 18 mm and 19 mm. This horizontal pitch may be consistent across the keyboard 400 as measured between like-sized adjacent keys in each of the rows 402-410. Thus, the keyboard 400 may be considered a full pitch keyboard. In a more specific example implementation, the horizontal pitch 412 may be about 18.4 mm. In other example implementations, the horizontal pitch 412 may be between about 18 mm and 19 mm.

Each of the rows of keys 402-410 is the same length or at least substantially the same length such that the outside edge of the first key and the outside edge of the last key in each row are aligned. The length 414 also may be referred to as a width of the rows 402-410. The length 414 of the rows 402-410 may be between 230 mm and 235 mm. In a more specific example, the length 414 may be about 233 mm. Thus, in one specific example, the horizontal pitch 412 may be about 18.4 mm and the length 414 may be about 233 mm.

The vertical pitch 416 may be the distance between the middle of a key on one row to the middle of a key in an adjacent row. For example, the vertical pitch 416 is measured between the middle of the "shift" key 418 in row 408 and the middle of the "search" key 420 in row 406. The vertical pitch may be consistent between each of the adjacent rows (402-404, 404-406, 406-408 and 408-410). In this example, the vertical pitch 416 may be between 18 mm and 19 mm. Full vertical pitch may be considered between 18 mm and 19 mm. Thus, the keyboard 400 provides both full horizontal pitch and full vertical pitch.

The height 422 of the keyboard may be measured from a bottom edge of the bottom row 410 and a top edge of the top row 402. In this example, the height 422 may be between 89 mm and 93 mm. In a more specific example, the height 422 may be about 91 mm.

The individual keys in the rows 402-410 may include different sizes and different shapes. A number of the individual keys also may be a substantially same size and substantially the same shape. For example, the keys that include the alphabet characters in rows 404, 406 and 408 all are substantially the same size and substantially the same shape. The alphabet character keys may be a substantially square shape having a same width and a same height. In one example implementation, the alphabet character keys may have a width and a height of about 16 mm.

The numbered keys "2", "3", "4", "5", "6", "7", "8", "9" and "0" in row 402 also may be substantially the same size and substantially the same shape. In the keyboard 400, these numbered keys in row 402 (other than "1") may be a substantially square shape like the alphabet keys. In one example, implementation, these numbered keys (other than "1") may have a width and a height of about 16 mm.

In this example, the "backspace" key and the "1" key in row 402 have a non-square shape and are wider than the substantially square keys. The "backspace" key and the "1" key are substantially rectangular in shape. In other example implementations, the "backspace" key may be made wider and the "1" key may be made substantially square shaped.

Other keys on the keyboard 400 also may have a substantially rectangular shape including the "shift" keys 418 and 436, the "ctrl" key 426, the "alt" key 428 and the spacebar key 430. It is understood that the width of one or more of the rectangular shaped keys may be changed and still keep the same overall length 414 of a row the same. For example, the width of the "ctrl" key 426 and/or the "alt" key 428 may be made smaller and the width of the spacebar key 430 may be made larger and the overall width of the row 410 may remain the same.

Other keys on the keyboard 400 may have a smaller width than one of the square shaped keys. For example, the "tab" key 432 may have a smaller width than one of the square shaped keys.

The keys in each of the rows 402-410 may be arranged and sized such that at least some of the keys are staggered or offset from row to row. For example, the "f" key in row 406 is offset from the "v" key in row 408 and offset from the "r" key in row 404. That is, those keys do not align in straight columns, but are instead offset with respect to each other.

To achieve the horizontal full pitch of the keys in the given length of the keyboard 400, several keys, which may be found on other keyboards, have been omitted. For example, the keyboard 400 includes only a single "ctrl" key 426 and a single "alt" key 428 to the left of the spacebar key 430 instead of a "ctrl" key and an "alt" key on both sides of the spacebar key 430. Also, while two "shift" keys 418 and 436 remain on the keyboard in the same row 408, the "shift" key 418 is wider than the "shift" key 436.

Further, other keys have been omitted from the keyboard 400, but may be accessed as virtual keys. For example, the "[/{" key and the "]/}" key have been removed from the keyboard 400 and implemented as a virtual key(s). In other keyboards, the "[/{" key and the "]/}" key may be found, for example, in row 404. Also, for example, the "~/`" key has been omitted and implemented as a virtual key(s). The "~/`" key may be found on other keyboards in row 402. Similarly, the "\/|" key has been omitted and implemented as a virtual key(s). The "\/|" key may be found on other keyboards in row 404.

Additionally, one or more keys have been moved on the keyboard 400 for where the keys may appear on other keyboards. For example, the "+/=" key 438 is in row 404, but on other keyboards the "+/=" key may be placed in the same row 402 as the number keys.

To implement the omitted keys as virtual keys, the keyboard 400 includes a launch key 440. The launch key 440 is placed next to the spacebar key 430 in the bottom row 410. When the launch key 440 is selected, the virtual keys may appear on a display of a computing device, as described below with respect to launch key 140 of FIG. 1 as described in FIG. 2 and FIG. 3.

Figure 5:
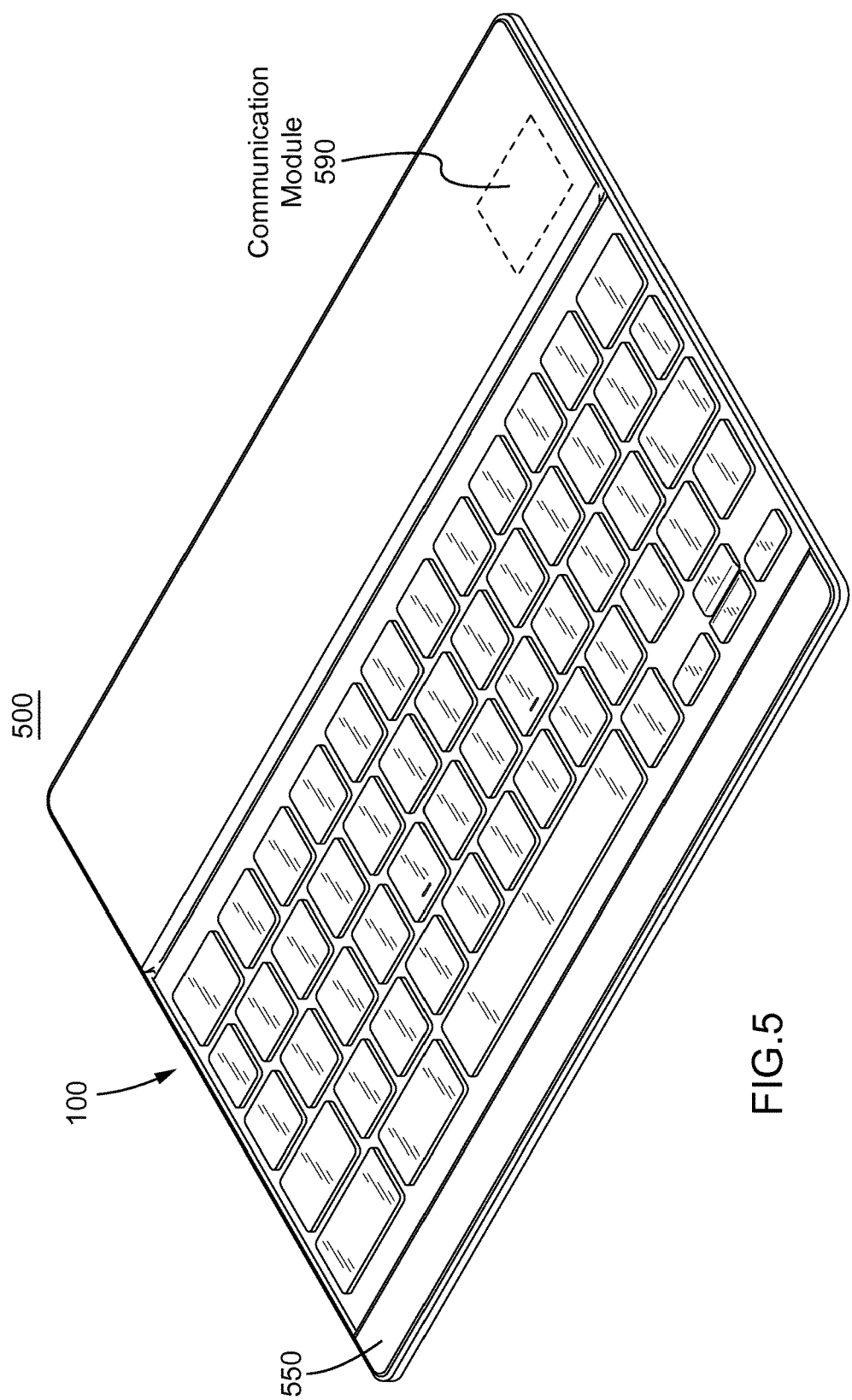
FIG. 5 is an example schematic of the keyboard of FIG. 1 in a base.

Referring to FIG. 5, an example schematic 500 illustrates the keyboard 100 of FIG. 1 in a base 550. While the example shows keyboard 100, it is understood that the keyboard 400 of FIG. 4 may also be used with the same base 550. The base 500 and the keyboard 100 may be a separate component from any computing device. The base 500 may include a communication module 590 to communicate in a wired and/or wireless manner with any computing device. For example, the base 550 may be wirelessly connected to a computing device using Bluetooth or other wireless communications. Additionally and/or alternatively, the base 550 may mate with a computing device and couple via a hard wire to the computing device.

Figure 6:
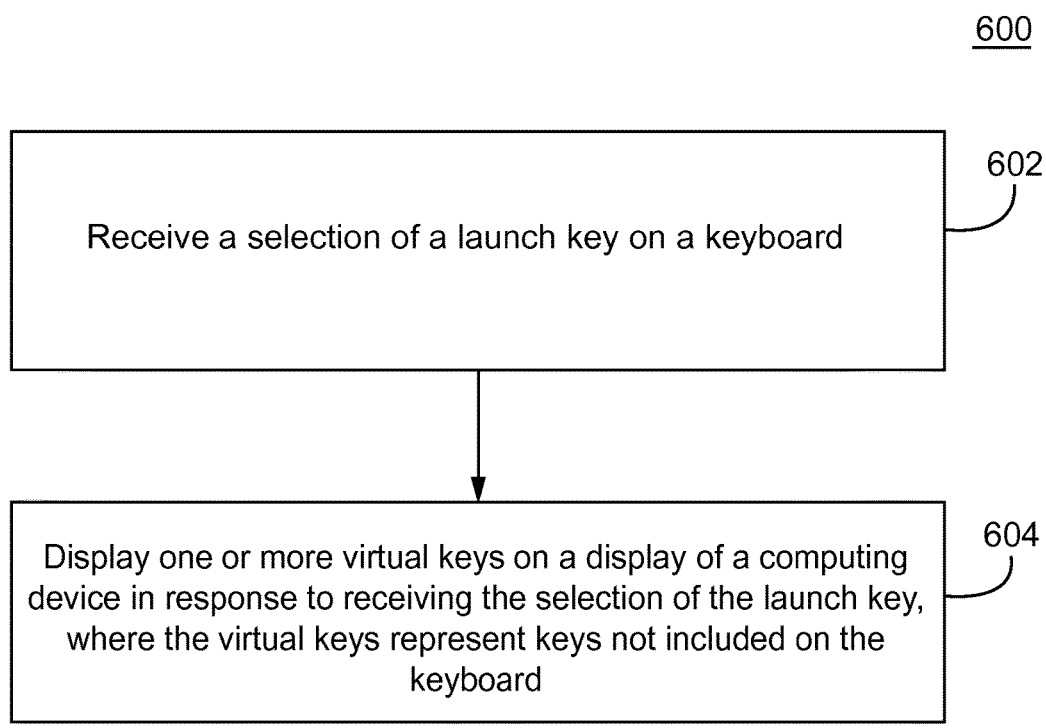
FIG. 6 is an example flow diagram of a process using the keyboards of FIGS. 1-4.

Referring to FIG. 6, an example flow diagram illustrates a process 600. Process 600 includes receiving a selection of a launch key on a keyboard (602) and displaying one or more virtual keys on a display of the computing device in response to receiving the selection of the launch key, where the virtual keys represent keys not included on the keyboard (604). For example, the keyboard may include the keyboard 100 of FIG. 1 or the keyboard 400 of FIG. 400. In response to receiving a selection of the launch key 140 or the launch key 440, the virtual keys 280-288 of FIG. 2 or the virtual keys 380-390 of FIG. 3 may be displayed on display 270. As discussed above, the virtual keys may represent keys that were omitted from the keyboards 100 and 400.

Figure 7:
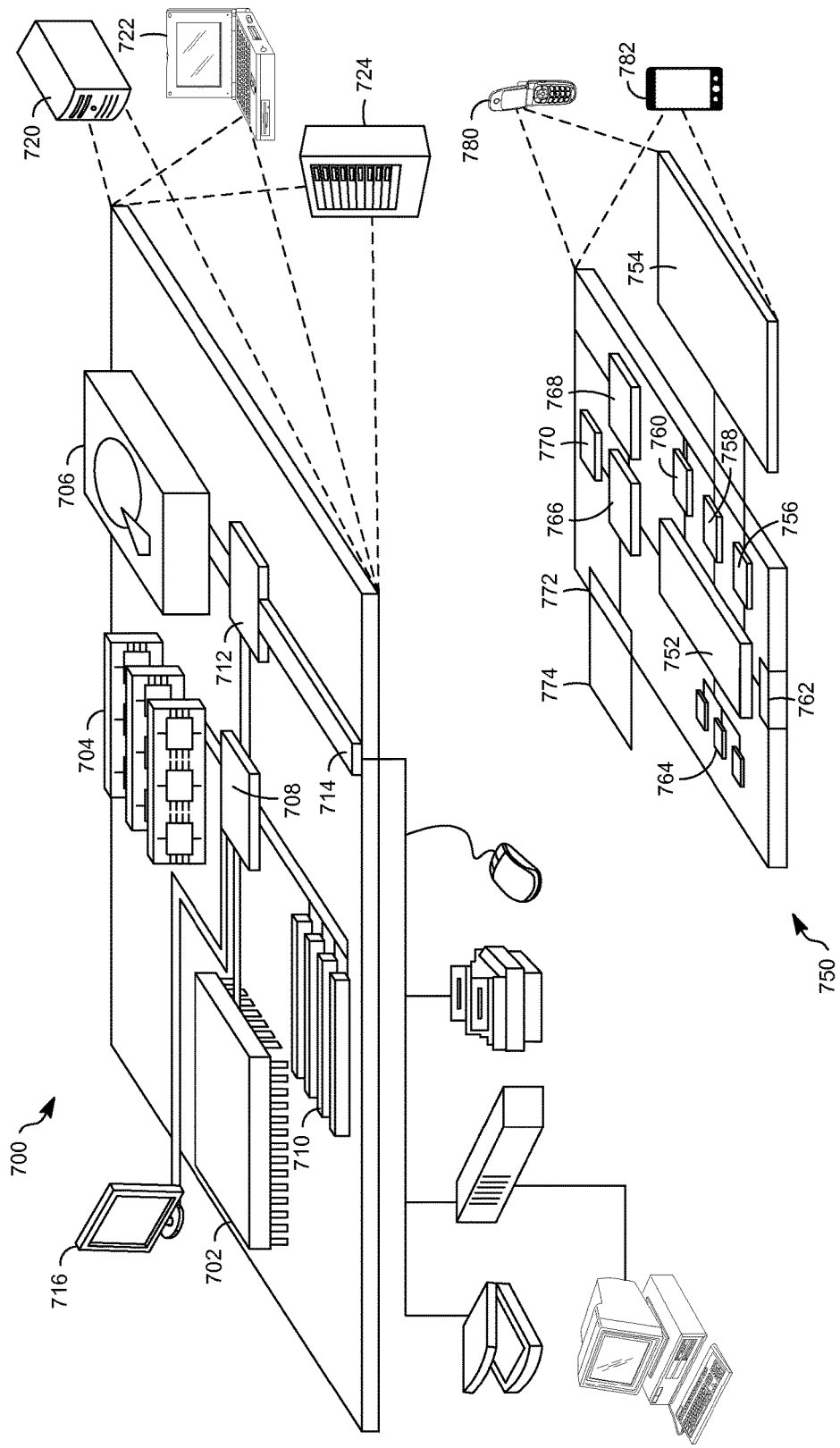
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard (e.g., keyboard 100 of FIG. 1 and keyboard 400 of FIG. 4), a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

What is claimed is:

1. A keyboard for use with a computing device, the keyboard comprising:
   a plurality of rows of keys with each of the rows of keys including a plurality of keys, wherein:
   a horizontal pitch of the keys is between 18 mm and 19 mm,
   a length of the rows of keys is between 230 mm and 235 mm, and
   one of the keys is a launch key that, when first selected, causes a processor of a computing device to initially display one or more virtual keys for selection on a touch screen display of the computing device and wherein:
   one or more of the virtual keys include a character and a number on the virtual key,
   the virtual keys are displayed on the touch screen display in alignment with a number key on the keyboard corresponding to the number on the virtual key, and
   the character on the virtual key is input in response to a selection of the number key on the keyboard corresponding to the number on the virtual key.

2. The keyboard of claim 1 wherein the horizontal pitch is between 18.4 mm and 19 mm.

3. The keyboard of claim 1 wherein:
   the horizontal pitch of the keys is about 18.8 mm, and
   the length of the rows of the keys is about 233 mm.

4. The keyboard of claim 1 wherein:
   the horizontal pitch of the keys is about 18.4 mm, and
   the length of the rows of the keys is about 233 mm.

5. The keyboard of claim 1 wherein an enter key spans across two rows of keys.

6. The keyboard of claim 1 wherein the rows of keys include five rows of keys.

7. The keyboard of claim 1 wherein a bottom row of the keys comprises a single control key, a single alternate key and a spacebar.

8. The keyboard of claim 1 wherein one or more of the virtual keys are selectable using one or more of the keys within the rows of keys.

9. The keyboard of claim 1 wherein one or more of the virtual keys represent keys that are not within the rows of keys.

10. The keyboard of claim 1 wherein the keyboard is physically separate and removable from the computing device and connects wirelessly to the computing device.

11. The keyboard of claim 1 wherein the keyboard is a part of the computing device, wherein the keyboard and the computing device are a laptop computing device.

12. A computing device, comprising:
   a memory that is configured to store instructions;
   a processor that is operably connected to the memory and that is configured to execute the instructions stored in the memory;
   a touch screen display that is operably coupled to the processor; and
   a keyboard, wherein:
   the keyboard includes a plurality of rows of keys with each of the rows of keys including a plurality of keys, and
   one of the keys is a launch key that, when first selected, causes the processor of the computing device to initially display one or more virtual keys for selection, wherein:
   the virtual keys include keys not included on the keyboard,
   one or more of the virtual keys include a character and a number on the virtual key,
   the virtual keys are displayed on the touch screen display in alignment with a number key on the keyboard corresponding to the number on the virtual key, and
   the character on the virtual key is input in response to a selection of the number key on the keyboard corresponding to the virtual key.

13. The computing device of claim 12 wherein:
the computing device includes a tablet computer;
the keyboard is physically separate and removable from the computing device; and
the keyboard communicates wirelessly with the computing device.

14. The computing device of claim 12 wherein the virtual keys are displayed on the touch screen display at a location of a cursor.

15. The computing device of claim 12 wherein the keys not included on the keyboard include a right bracket key, a left bracket key, an escape key, a right brace key, a left brace key, a backslash key, a pipe key, an acute key and a tilde key.

16. The computing device of claim 12 wherein the launch key, when selected, causes a processor of the computing device to display one or more virtual keys for selection on the touch screen display, wherein the virtual keys include keys related to an application being run on the computing device.

17. A computer-implemented method comprising executing instructions stored on a non-transitory computer storage device that, when executed, cause a computing device to perform the actions of:
receiving a first selection of a launch key on a keyboard; and
initially displaying one or more virtual keys in response to receiving the first selection of the launch key, wherein the virtual keys represent keys not included on the keyboard and wherein:
one or more of the virtual keys include a character and a number on the virtual key,
the virtual keys are displayed on a touch screen display in alignment with a number key on the keyboard corresponding to the number on the virtual key, and
the character on the virtual key is input in response to a selection of the number key on the keyboard corresponding to the number on the virtual key.

18. The computer-implemented method of claim 17 wherein the virtual keys represent include keys related to an application running on the computing device.

19. The computer-implemented method of claim 17 wherein the keyboard includes a plurality of rows of keys with each of the rows of keys including a plurality of keys and a horizontal pitch of the keys is between 18 mm and 19 mm and a length of the rows of the keys is between 230 mm and 235 mm.

* * * * *